United States Patent
Takemura et al.

(10) Patent No.: US 11,152,721 B2
(45) Date of Patent: Oct. 19, 2021

(54) PLASTIC WINDOW

(71) Applicant: KABUSHIKI KAISHA TOYOTA JIDOSHOKKI, Kariya (JP)

(72) Inventors: Kenji Takemura, Aichi-ken (JP); Toshihiro Goto, Aichi-ken (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 637 days.

(21) Appl. No.: 15/628,106

(22) Filed: Jun. 20, 2017

(65) Prior Publication Data

US 2018/0013215 A1    Jan. 11, 2018

(30) Foreign Application Priority Data

Jul. 6, 2016    (JP) .............................. JP2016-133887

(51) Int. Cl.
*H01R 4/02*    (2006.01)
*H01R 11/01*    (2006.01)
(Continued)

(52) U.S. Cl.
CPC .............. *H01R 11/01* (2013.01); *B60S 1/026* (2013.01); *H01R 4/02* (2013.01); *H05B 3/02* (2013.01); *H05B 3/06* (2013.01); *H05B 3/84* (2013.01)

(58) Field of Classification Search
CPC ........ H05B 1/0236; H05B 3/265; H05B 3/84; H05B 2203/035; H05B 2203/031;
(Continued)

(56) References Cited

U.S. PATENT DOCUMENTS 3,467,818 A * 9/1969 Ballentine ................ H05B 3/84
    219/522
4,450,346 A * 5/1984 Boaz ........................ H05B 3/84
    219/203
(Continued)

FOREIGN PATENT DOCUMENTS

DE      35 32 119 A1    3/1987
DE    199 28 000 A1    1/2000
(Continued)

OTHER PUBLICATIONS

English Translation of JP2015171829A (Year: 2015).*
Office Action dated Jan. 22, 2020 in German Application No. 102017114804.3.

*Primary Examiner* — Erin E McGrath
*Assistant Examiner* — Tiffany T Tran
(74) *Attorney, Agent, or Firm* — Sughrue Mion, PLLC

(57) ABSTRACT

A plastic window includes a plastic window body, a conductive portion, a first bus bar, and a second bus bar. The window body is formed in a plate shape and has a first surface and a second surface on both sides thereof. The conductive portion and the first bus bar are made of a conductive material and disposed on the second surface of the window body. The first bus bar is electrically connected to the conductive portion. The second bus bar is made of a conductive metal strip and disposed to be electrically connected to the first bus bar. The second bus bar has a main body, first fixing portions, and second fixing portions. The first fixing portions fix the main body to the second surface. The second fixing portions extend from the main body along the second surface and are attached to the first bus bar.

9 Claims, 9 Drawing Sheets

(51) Int. Cl.
*H05B 3/84* (2006.01)
*H05B 3/06* (2006.01)
*B60S 1/02* (2006.01)
*H05B 3/02* (2006.01)

(58) Field of Classification Search
CPC ... H05B 2203/016; B60S 1/026; H01R 11/01; H01R 4/02
USPC ....... 219/200, 201, 203, 498, 539, 522, 509, 219/541, 543–544, 547; 338/322
See application file for complete search history.

(56) References Cited

U.S. PATENT DOCUMENTS

| | | |
|---|---|---|
| 4,721,845 A | 1/1988 | Kunert et al. |
| 6,103,999 A | 8/2000 | Nishio et al. |
| 2004/0016738 A1* | 1/2004 | Bartrug .................. B32B 27/32 219/203 |
| 2008/0268672 A1* | 10/2008 | Sargent .................. H01R 12/57 439/78 |
| 2015/0181653 A1* | 6/2015 | Lesmeister .............. H05B 3/06 219/203 |
| 2015/0298528 A1* | 10/2015 | Lahnala .................. B60J 1/1853 49/70 |
| 2017/0238371 A1* | 8/2017 | Lahnala .................. H05B 3/84 219/203 |

FOREIGN PATENT DOCUMENTS

| | | | |
|---|---|---|---|
| DE | 694 23 054 T2 | 9/2000 | |
| JP | 06-013060 U | 2/1994 | |
| JP | H0613060 U * | 2/1994 | |
| JP | H0644031 B2 * | 6/1994 | ............ G06F 11/273 |
| JP | 2015171829 A * | 10/2015 | |

* cited by examiner

PLASTIC WINDOW

BACKGROUND OF THE INVENTION

The present invention relates to a plastic window.

Japanese Unexamined Utility Model Application Publication No. H06-13060 discloses a window. The window includes a window body, a conductive portion, a first bus bar, and a second bus bar. The window body is a plate made of an inorganic glass and has a first surface and a second surface on the both sides thereof. The conductive portion is formed on the second surface of the window body. The first bus bar is also formed on the second surface of the window body and electrically connected to the conductive portion. In this window, the conductive portion and the first bus bar are typically formed by printing a conductive paste-like material onto the second surface of the window body and baking the paste-like material with the window body. The second bus bar is made of a conductive metal strip and has a main body and a plurality of fixing portions. The main body extends parallel to the second surface of the window body and the fixing portions are formed in the main body and soldered to the first bus bar, so that the second bus bar is electrically connected to the first bus bar.

The conductive portion is energized by electric current flowing from the second bus bar through the first bus bar, thereby producing heat to defog and defrost on the window body.

To meet the recent demands for weight reduction and easy manufacturing in various industrial fields, the glass window body tends to be replaced with the plastic window body without changing the configuration of the window.

However, the plastic window body expands and contracts more due to a change of temperature than the metallic second bus bar, which causes that the second bus bar is subjected to large stress at the points where the fixing portions of the second bus bar are soldered to the first bus bar. Additionally, the first bus bar which is made of a conductive material has a rough surface, resulting in insufficient attachment of the fixing portions to the first bus bar. Therefore, the fixing portions of the second bus bar may fall off the first bus bar, which impedes the flow of electric current from the second bus bar to the first bus bar.

In adopting a plastic window body instead of a glass window body, it may be contemplated to allow electric current to flow to the conductive portion from the first bus bar only without using the second bus bar. In such case, the first bus bar needs to be densified or thickened to reduce the electric resistance thereof enough to prevent the first bus bars from becoming overheated.

However, the above method is impractical because the plastic window cannot withstand being baked at an extremely high temperature for densification. Additionally, the method requires an increased amount of the conductive material and man-hours, which causes rising manufacturing cost of the plastic window.

The present invention, which has been made in light of the above-described problems, is directed to providing a plastic window with excellent durability while achieving weight reduction, easy manufacturing, and manufacturing cost saving.

SUMMARY OF THE INVENTION

In accordance with one aspect of the present invention, there is provided a plastic window including a plastic window body, a conductive portion, a first bus bar, and a second bus bar. The plastic window body is formed in a plate shape and has a first surface and a second surface on the both sides thereof. The conductive portion and the first bus bar are made of a conductive material and disposed on the second surface of the window body. The first bus bar is electrically connected to the conductive portion. The second bus bar is made of a conductive metal strip and disposed to be electrically connection to the first bus bar. The second bus bar has a main body, first fixing portions, and second fixing portions. The first fixing portions fix the main body to the second surface. The second fixing portions extend from the main body along the second surface and are attached to the first bus bar.

Other aspects and advantages of the invention will become apparent from the following description, taken in conjunction with the accompanying drawings, illustrating by way of example the principles of the invention.

DETAILED DESCRIPTION OF THE EMBODIMENTS

The following will describe five embodiments of the present invention with reference to the accompanying drawings. Plastic windows in the following description are all used in vehicles.

First Embodiment

Figure 1:
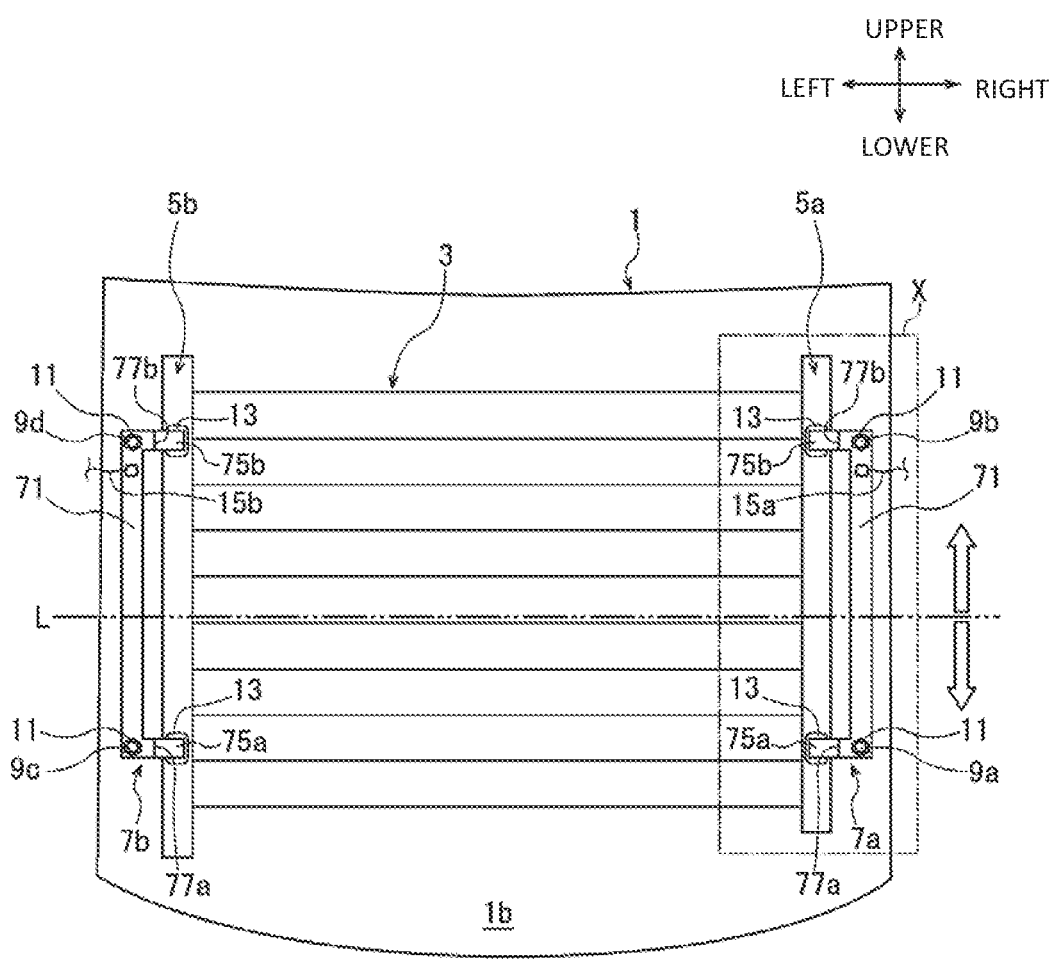
FIG. 1 is a view of a plastic window according to a first embodiment of the present invention, as viewed from the second surface side of the plastic window.
Figure 4:
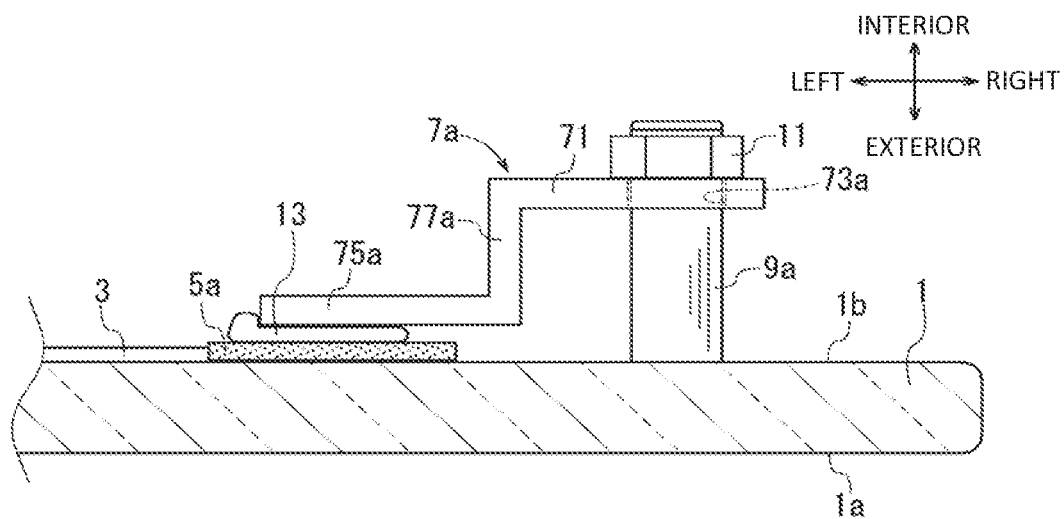
FIG. 4 is an enlarged cross-sectional view of the plastic window taken along the line IV-IV of FIG. 2.
Figure 5:
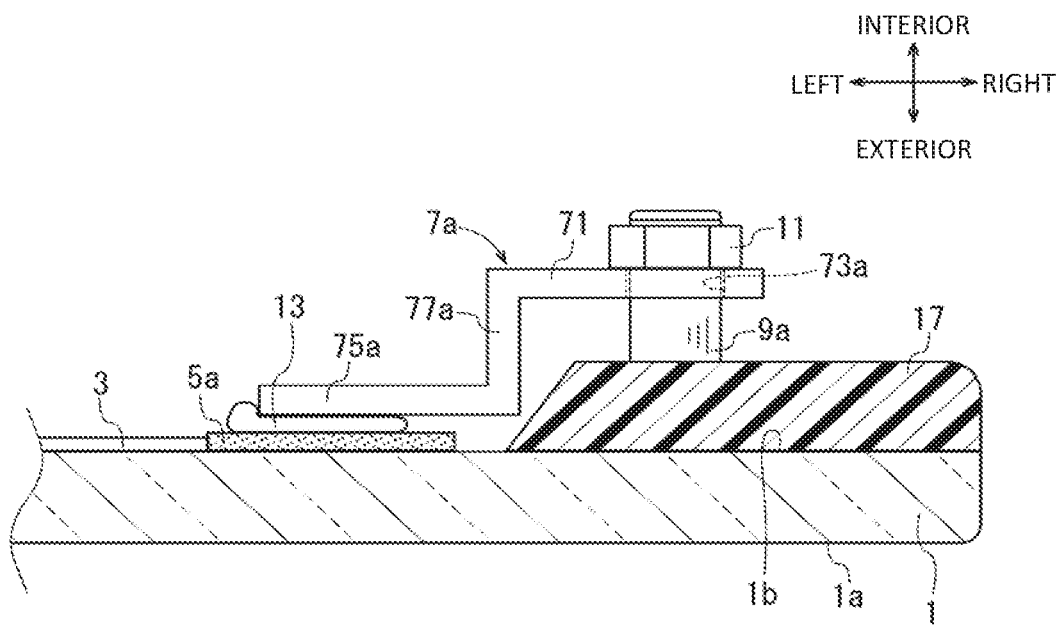
FIG. 5 is a view similar to FIG. 4, but showing a plastic window according to a second embodiment of the present invention.
Figure 10:
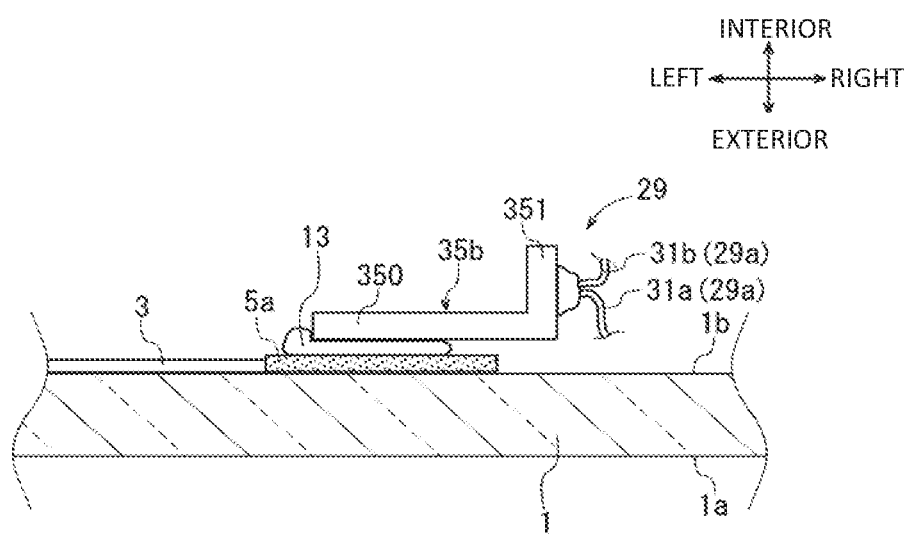
FIG. 10 is an enlarged cross-sectional view of the plastic window taken along the line X-X of FIG. 9.

Referring to FIG. 1, there is shown a plastic window according to a first embodiment of the present invention including a window body 1, a conductive portion 3, first bus bars 5a, 5b, and second bus bars 7a, 7b. Directional notations appearing in the drawings and the following description are associated with the window body 1 which is generally shown in FIG. 1. Namely, right and left represent the horizontal direction and upper and lower the vertical direction. Additionally, FIGS. 4, 5, and 10 show directions associated with the plastic window as mounted on a vehicle. Namely, interior represents the direction toward the inside of the vehicle, and exterior toward the outside. The directional notations are for the sake of the description of the embodiments.

Figure 2:
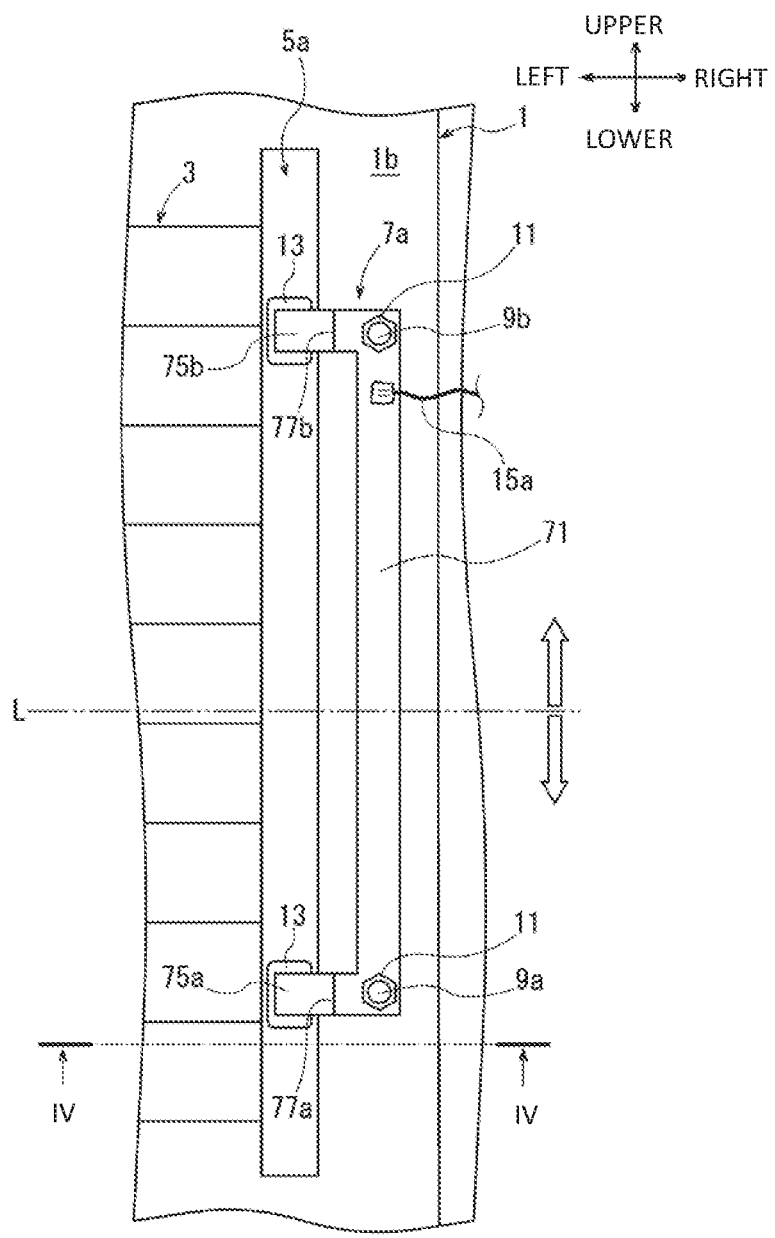
FIG. 2 is a fragmentary enlarged view of the region X of FIG. 1.

Referring to FIGS. 1 and 2, there is shown an imaginary line, which will be referred to as a reference line L against which expansion and contraction of the plastic window due to a change of temperature may be determined. The reference line L is located approximately on the center of the window body 1 in the vertical direction and extends in the horizontal direction thereof.

As shown in FIGS. 1 and 4, the window body 1 is formed in an approximately rectangle plate shape and has a first surface 1a and a second surface 1b on the both sides thereof. The first surface 1a and the second surface 1b respectively face outward and inward of a vehicle on which the window body 1 is mounted.

The window body 1 is mainly made of polycarbonate which is transparent and colorless and allows light to pass from the first surface 1a to the second surface 1b. According to the present invention, however, the window body 1 needs not necessarily be 100% transparent to visible light. The window body 1 may be translucent or colored as long as it has translucency permitting light transmission from the first surface 1a to the second surface 1b. Additionally, the window body 1 may be mainly made of a synthetic resin or a plastic other than polycarbonate, and the thickness thereof may be determined as needed.

The conductive portion 3 and the first bus bars 5a, 5b shown in FIG. 1 are made of a known conductive material and formed on the second surface 1b by screen-printing. The conductive portion 3 and the first bus bars 5a, 5b may be formed on the second surface 1b by any means other than the screen-printing.

The conductive portion 3 is located approximately in the center of the second surface 1b and formed by a plurality of conductive grid lines each extending linearly in the horizontal direction of the window body 1. The first bus bars 5a, 5b extend in the vertical direction of the window body 1 and are located on and electrically connected to the right and left sides of the conductive portion 3 on the second surface 1b, respectively. The first bus bars 5a, 5b, which are made of a conductive material, have surfaces that are rougher than the first surface 1a and the second surface 1b of the window body 1.

As shown in the FIGS. 1 and 4, a plurality of shanks 9a to 9d, which will be referred to as first to fourth shanks provided protruding from the second surface 1b toward the inside of the vehicle.

The first shank 9a and the second shank 9b are located on the right side of the first bus bar 5a, and the third shank 9c and the fourth shank 9d are on the left side of the first bus bar 5b. The first shank 9a and the third shank 9c are arranged at respective positions below the reference line L spaced at the same distance from the reference line L, and the second shank 9b and the fourth shank 9d are arranged above the reference line L and spaced at the same distance from the reference line L.

The second bus bars 7a, 7b have shapes symmetrical to each other and have the same configuration. The following will describe the second bus bars 7a, 7b focusing on the second bus bar 7a.

Figure 3:
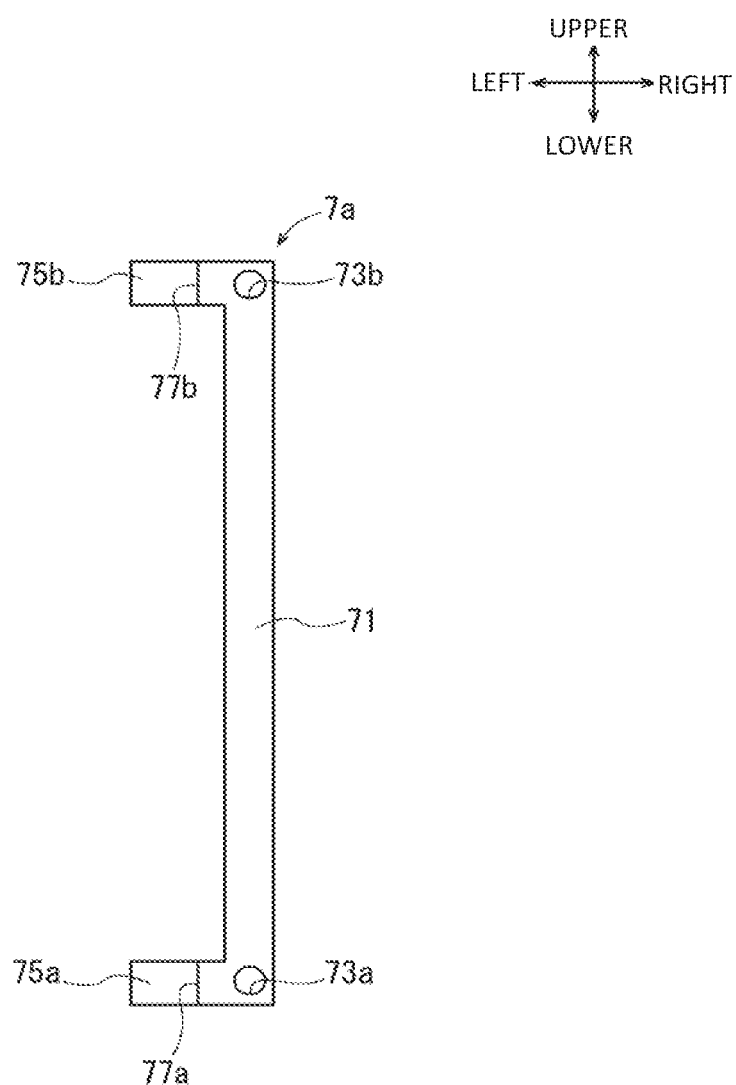
FIG. 3 is a view showing a second bus bar of the plastic window of FIG.

The second bus bar 7a is made of a conductive metal strip, and includes a main body 71, first fixing portions 73a, 73b and second fixing portions 75a, 75b as shown in FIGS. 2 to 4.

As shown in FIG. 2, the main body 71 is arranged extending vertically and parallel to the second surface 1b of the window body 1, and the first fixing portions 73a, 73b are provided by holes formed through the lower and upper ends of the main body 71, respectively, as shown in FIG. 3. The first shank 9a and the second shank 9b are insertable through the first fixing portions 73a, 73b, respectively, as shown in FIG. 2.

The second fixing portions 75a, 75b are respectively formed at the lower and upper ends of the main body 71 extending leftward from the main body 71 and parallel to the second surface 1b of the window body 1, so that the main body 71 and the second fixing portions 75a, 75b cooperate to form the second bus bar 7a in an approximately U-shape. Additionally, a first stepped portion 77a is formed between the main body 71 and the second fixing portion 75a, and a second stepped portion 77b is formed between the main body 71 and the second fixing portion 75b.

As shown in FIGS. 1, 2, and 4, the second bus bar 7a is fixed to the first bus bar 5a and the second surface 1b. Specifically, the second fixing portions 75a, 75b of the second bus bar 7a are soldered to the first bus bar 5a so as to be conductive to the first bus bar 5a through soldered portions 13. As shown in FIG. 2, the second bus bar 7a is soldered to the first bus bar 5a across the reference line L. Specifically, the second fixing portions 75a, 75b of the second bus bar 7a are soldered to the first bus bar 5a at respective positions below and above the reference line L.

As shown in FIGS. 2 and 4, the second bus bar 7a is also fixed to the second surface 1b of the window body 1 by the first and the second shanks 9a, 9b inserted through the first fixing portions 73a, 73b and nuts 11 tightened on the first and the second shanks 9a, 9b at the respective positions below and above the reference line L. Therefore, the main body 71 of the second bus bar 7a is fixed to the second surface 1b of the window body 1 across the reference line L.

Also in the second bus bar 7a shown in FIG. 4, the provision of the first stepped portion 77a and the second stepped portion 77b (not shown) positions the second fixing portions 75a, 75b (not shown) closer to the second surface 1b of the window body 1 than the main body 71, so that the second fixing portions 75a, 75b are fixed to the first bus bar 5a through the soldered portions 13, respectively, in a state that the second fixing portions 75a, 75b are pressed against the soldered portions 13.

Though the above description has been made with reference to the first bus bar 5a and the second bus bar 7a, the same is true of the first bus bar 5b and the second bus bar 7b shown in FIG. 1. Specifically, the main body 71 of the second bus bar 7b is fixed to the second surface 1b of the window body 1 by the third and the fourth shanks 9c, 9d inserted through the first fixing portions 73a, 73b, and the nuts 11, and the second fixing portions 75a, 75b of the second bus bar 7b are also soldered to the first bus bar 5b through the soldered portions 13, respectively, thereby fixing the second bus bar 7b to the first bus bar 5b.

Lead wires 15a, 15b are respectively soldered to the main bodies 71 of the second bus bars 7a, 7b so as to be electrically connected to a controller of the vehicle on which the plastic window is mounted (not shown in the figures). The lead wires 15a, 15b may be attached to the main bodies 71 by means other than soldering.

In the plastic window configured as described above, electric current flows from the controller to the conductive portion 3 through the lead wires 15a, 15b, the second bus bars 7a, 7b, and then the first bus bars 5a, 5b, so that the conductive portion 3 produces heat to defog or defrost on the plastic window.

The plastic window weighs less and enables easier manufacturing than an inorganic glass window. However, the plastic window body 1 expands and contracts more due to a change of temperature than the metallic second bus bars 7a, 7b.

Specifically, when expansion occurs in the plastic window with increase in temperature, the window body 1 and the second bus bars 7a, 7b expand upward and downward with respect to the reference line L as indicated by the blank arrows in FIGS. 1 and 2. In this case, the plastic window body 1 expands more than the metallic second bus bars 7a, 7b. Also, the plastic window body 1 contracts more than the metallic second bus bars 7a, 7b in the directions opposite to the arrows with a decrease in temperature.

In the plastic window according to the first embodiment of the present invention, the second fixing portions 75a, 75b of the second bus bar 7a are soldered to the first bus bar 5a. In addition to that, the main body 71 of the second bus bar 7a is securely fixed to the second surface 1b of the window body 1 by the first and the second shanks 9a, 9b inserted through the first fixing portions 73a, 73b, and the nuts 11. When the plastic window body 1 thus constructed expands and contracts with a change of temperature, the second bus bar 7a is not likely to be subjected to large stress at the points where the second fixing portions 75a, 75b are soldered to the first bus bar 5a. Therefore, the second bus bar 7a is not likely to fall off the rough surface of the first bus bar 5a by a large expansion of the window body 1 due to a change of temperature. The same is true of the first bus bar 5b and the second bus bar 7b.

Additionally, in the plastic window in which electric current flows to the conductive portion 3 through the second bus bars 7a, 7b in addition to the first bus bars 5a, 5b the first bus bars 5a, 5b do not need to be excessively densified or thickened to prevent overheating, unlike the case in which the electric current flows through the first bus bars 5a, 5b only. Therefore, this plastic window of the present embodiment does not excessively require conductive materials and man-hours to form the first bus bars 5a, 5b.

Therefore, the plastic window according to the first embodiment of the present invention provides excellent durability while achieving weight reduction, easy manufacturing, and manufacturing cost saving.

If the second bus bars 7a, 7b are fixed only to the first bus bars 5a, 5b, the number of the second fixing portions needs to be large enough to prevent the second bus bars 7a, 7b from falling off the first bus bars 5a, 5b. In the plastic window according to the present embodiment in which the second bus bars 7a, 7b are fixed to the second surface 1b of the window body 1 in addition to the first bus bars 5a, 5b, however, the two second fixing portions 75a, 75b are enough to prevent the second bus bars 7a, 7b from falling off the first bus bars 5a, 5b. Therefore, the plastic window according to the present embodiment achieves easy manufacturing.

Second Embodiment

The following will describe a second embodiment of the present invention with reference to FIG. 5. The plastic window according to the second embodiment of the present invention differs from the first embodiment in that a cover 17 is provided on the second surface 1b of the window body 1 along the edge of the second surface 1b. The cover 17 is frame shaped and made of an opaque and black polycarbonate. It is noted that the cover 17 needs not necessarily be black and made of polycarbonate, and the thickness thereof may be determined as needed.

In this plastic window, the first to the fourth shanks 9a to 9d are formed on the cover 17. As is the case in the first embodiment, the main body 71 of the second bus bar 7a is fixed by the first and the second shanks 9a, 9b inserted through the first fixing portions 73a, 73b and the nuts 11. The same is true of the main body 71 of the second bus bar 7b. The rest of the configuration of the plastic window according to the second embodiment is same as the first embodiment. Thus, the same elements are designated by the same reference characters and the detailed explanation thereof will be omitted.

The black opaque cover 17 hides the most part of the second bus bars 7a, 7b from the outside. Therefore, this embodiment of the present invention helps to provide the good appearance of the plastic window. The functions and effects mentioned with reference to the first embodiment are also applicable to the second embodiment.

Third Embodiment

Figure 6:
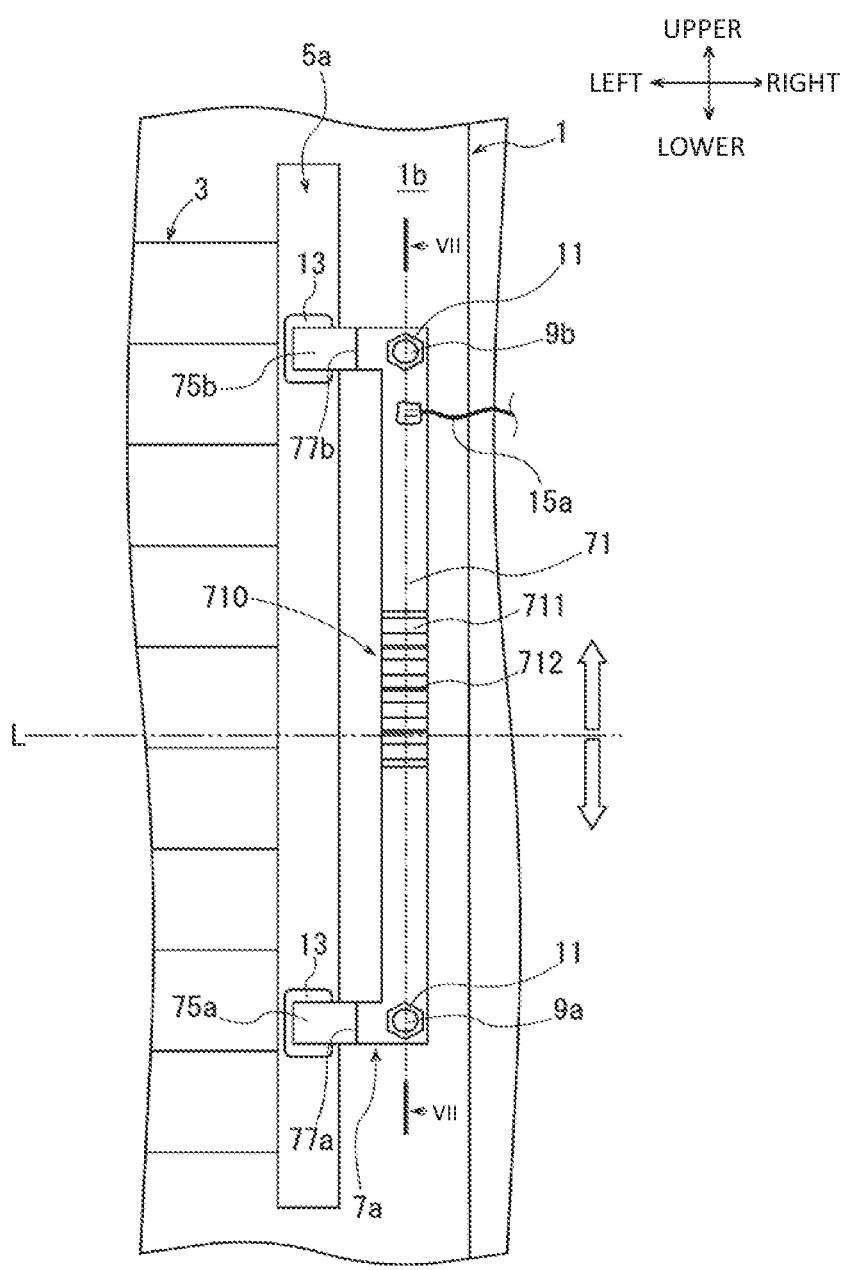
FIG. 6 is a view similar to FIG. 2, but showing a plastic window according to a third embodiment of the present invention.
Figure 7:
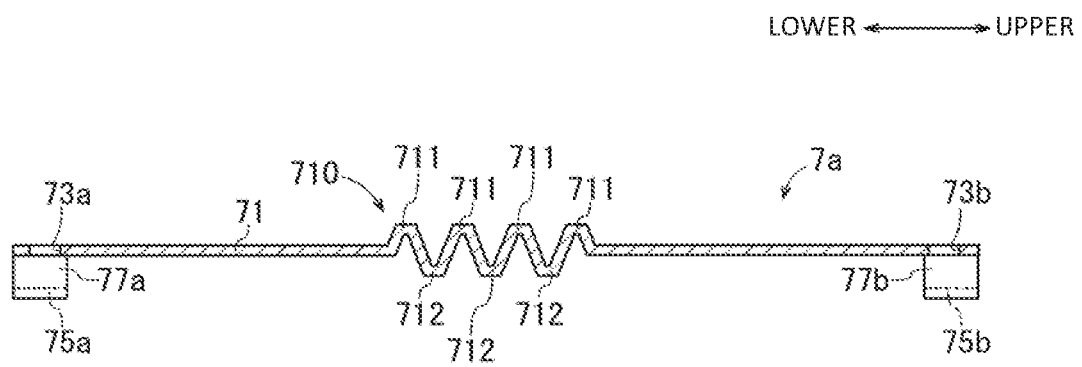
FIG. 7 is an enlarged cross-sectional view of a second bus bar taken along the line VII-VII of FIG. 6.

As shown in FIGS. 6 and 7, in the plastic window according to a third embodiment of the present invention, the main body 71 of the second bus bar 7a includes a buffer portion 710. The same is true of the second bus bar 7b (not shown).

As shown in FIG. 7, the main body 71 includes the buffer portion 710 in the approximate longitudinal center thereof and the buffer portion 710 is configured in a zigzag shape with a plurality of turns 711, 712 in alternate directions. The number and shape of the alternate turns 711, 712 may be determined as needed. The rest of the configuration of the plastic window is the same as the first embodiment.

In the plastic window, when the second bus bars 7a, 7b and the window body 1 respectively expand and contract due to a change of temperature, the buffer portions 710 expand and contract accordingly. In other words, the second bus bars 7a, 7b elongate vertically along with the vertical expansion of the buffer portions 710 due to a change of temperature, which means that the buffer portions 710 absorb the difference in expansion between the window body 1 and the second bus bars 7a, 7b. The same is true of the difference in contraction therebetween. Therefore, even when the window body 1 expands and contracts more than the second bus bars 7a, 7b, large stress is not generated at the points where the main bodies 71 of the second bus bars 7a, 7b are fixed to the window body 1 through the first fixing portions 73a, 73b and the points where the second fixing portions 75a, 75b of the main bodies 71 are soldered to the first bus bars 5a, 5b, so that the second fixing portions 75a, 75b are not likely to fall off the first bus bars 5a, 5b. The functions and effects mentioned with reference to the first embodiment are also applicable to the third embodiment.

Fourth Embodiment

Figure 8:
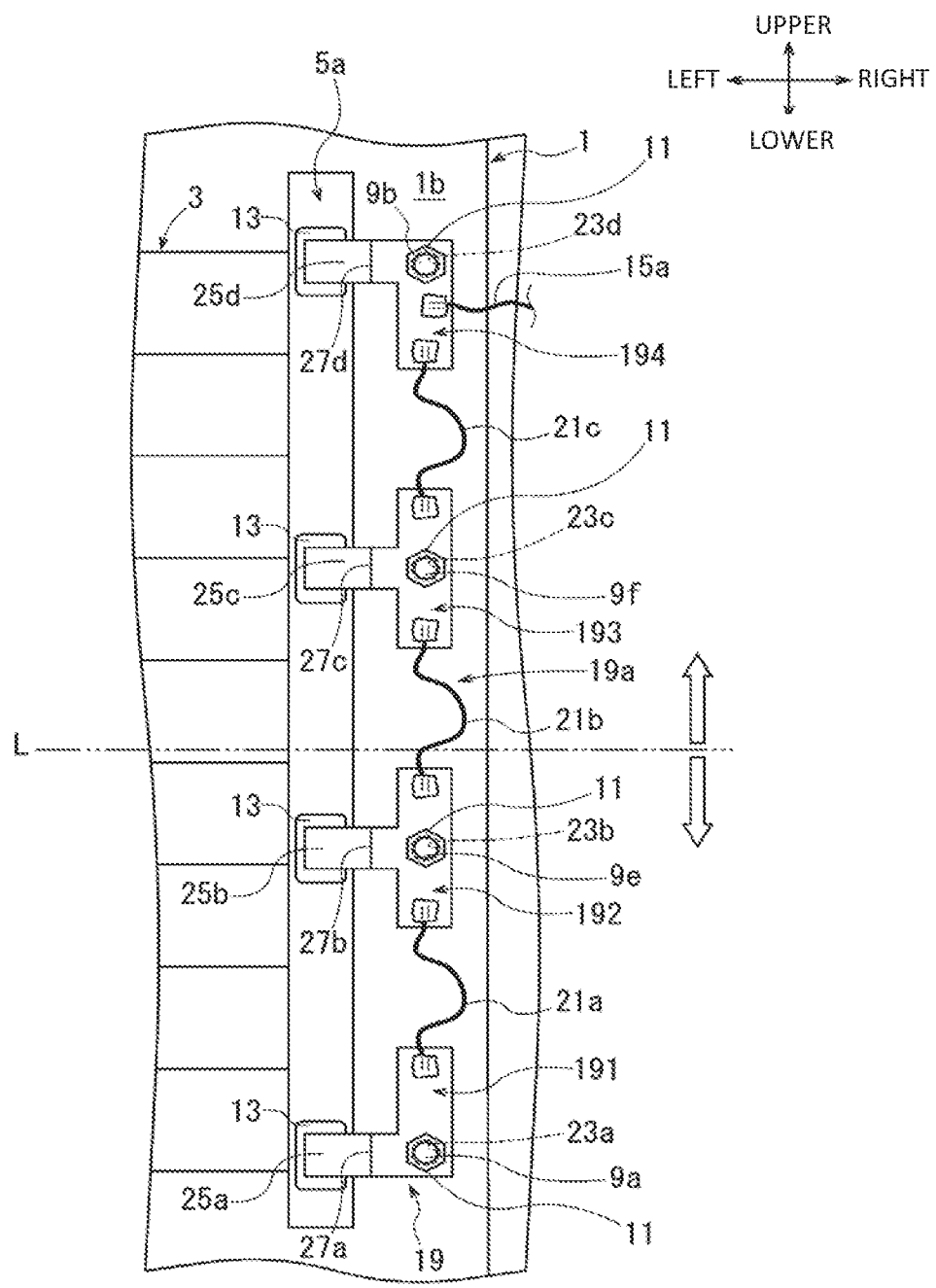
FIG. 8 is a view similar to FIG. 2, but showing a plastic window according to a fourth embodiment of the present invention.

The following will describe a plastic window according to a fourth embodiment of the present invention with reference to FIG. 8. The fourth embodiment differs from the first embodiment in that the second bus bars 7a, 7b are substituted by a matched pair of second bus bars 19 (only one of the second bus bars 19 is shown in FIG. 8). Like the second bus bars 7a, 7b, the bus bars 19 are symmetrical to each other and respectively arranged on the right and left parts of the second surface 1b of the window body 1. The following description will focus on the second bus bar 19 arranged on the right part of the second surface 1b.

The second bus bar 19 includes a plurality of connection pieces, namely the first to the fourth connection pieces 191 to 194, and a plurality of lead wires, namely the first to the third lead wires 21a to 21c which serve as the buffer portions. Wiring with the first to the third lead wires 21a to 21c is an example of wiring according to the present invention. The first to the fourth connection pieces 191 to 194 and the first to the third lead wires 21a to 21c cooperate to form a main body 19a of the second bus bar 19. The second bus bar 19 further has first fixing portions 23a to 23d and second fixing portions 25a to 25d.

The first to the fourth connection pieces 191 to 194 are made of a conductive metal and arranged vertically upward in this order at regular intervals.

The first fixing portion 23a is formed through the first connection piece 191 at the lower end thereof. The first fixing portions 23b, 23c are formed through the second and the third connection pieces 192, 193, respectively, at the approximate center thereof. The first fixing portion 23d is formed through the fourth connection piece 194 at the upper end thereof.

The second fixing portion 25a is formed continuing and extending leftward from the lower end of the first connection piece 191 and hence from the main body 19a parallel to the second surface 1b of the window body 1. Additionally, a first stepped portion 27a is formed between the first connection piece 191 and the second fixing portion 25a as well as the first stepped portion 77a in the first embodiment. The second fixing portion 25b is formed continuing and extending leftward from the approximate center of the second connection piece 192 and hence the main body 19a parallel to the second surface 1b of the window body 1. A second stepped portion 27b is formed between the second connection piece 192 and the second fixing portion 25b as well as the first stepped portion 27a. The second fixing portion 25c is formed continuing and extending leftward from the approximate center of the second connection piece 193 and hence the main body 19a parallel to the second surface 1b of the window body 1. A second stepped portion 27c is formed between the third connection piece 193 and the second fixing portion 25c. The second fixing portion 25d is formed continuing and extending leftward from the upper end of the fourth connection piece 194 and hence the main body 19a parallel to the second surface 1b of the window body 1. A fourth stepped portion 27d is formed between the fourth connection piece 194 and the second fixing portion 25d as well as the first stepped portion 27a.

The upper and lower ends of the first lead wire 21a are respectively soldered to the lower end of the second connection piece 192 and the upper end of the first connection piece 191. In other words, the first connection piece 191 and the second connection piece 192 are connected through the first lead wire 21a. The same connection is true of the second and the third lead wires 21b and 21c. Therefore, the first to the fourth connection pieces 191 to 194 are electrically connected through the first lead wire 21a between the first connection piece 191 and the second connection piece 192, the second lead wire 21b between the second connection piece 192 and the third connection piece 193, and the third lead wire 21c between the third connection piece 193 and the fourth connection piece 194.

The first to the third lead wires 21a to 21c are longer than the respective distances between the first connection piece 191 and the second connection piece 192, between the second connection piece 192 and the third connection piece 193, and between the third connection piece 193 and the fourth connection piece 194. The first to the third lead wires 21a to 21c may be connected to the first to the fourth connection pieces 191 to 194 by any other means than soldering.

In this plastic window according to the fourth embodiment of the present invention, a fifth shank 9e and a sixth shank 9f are provided between the first shank 9a and the second shank 9b, protruding from the second surface 1b of the window body 1 to the inside of the vehicle. Though not shown in the drawing, two shanks are also provided between the third shank 9c and the fourth shank 9d on the left part of the second surface 1b of the window body 1.

The right second bus bar 19 is fixed to the first bus bar 5a and to the second surface 1b of the window body 1. Specifically, as well as the second bus bar 7a, the second fixing portions 25a and 25b of the second bus bar 19 are soldered to the first bus bar 5a below the reference line L and the second fixing portions 25c and 25d of the second bus bar 19 are soldered to the first bus bar 5a above the reference line L for electrical connection to the first bus bar 5a through the soldered portions 13.

The first connection piece 191 is fixed to the second surface 1b of the window body 1 by the first shank 9a inserted through the first fixing portion 23a and the nut 11. This configuration is true of the second to the fourth connection pieces 192 to 194, so that the main body 19a of the second bus bar 19 is fixed to the second surface 1b extending vertically on the right side of the first bus bar 5a. Additionally, the lead wire 15a is soldered to the fourth connection piece 194, but it may be soldered to any of the first to the third connection pieces 191 to 193.

The left second bus bar 19 (not shown in the drawing) is fixed to the first bus bar 5b and the second surface 1b of the window body 1 in the same manner as the right second bus bar 19. The rest of the configuration of this plastic window is same as the first embodiment of the present invention.

In this plastic window, expansion and contraction of the window body 1 and each second bus bar 19 occurring due to a change of temperature cause the distance between any two adjacent connection pieces to be changed. However, in the plastic window body 1 of the fourth embodiment in which the lead wire, e.g. 21a, connected between any two adjacent connection pieces, e.g. 191 and 192, is provided longer than the distance such connection pieces so as to absorb the difference in expansion and contraction between the window body 1 and each second bus bar 19 by slack of the lead wire 21a, so that the second fixing portion, e.g. 25a, is not likely to fall off the first bus bar 5a. The same is true of the lead wires connected between any two adjacent connection pieces of second bus bars 19.

In this plastic window, the first to the fourth connection pieces 191 to 194 and the first to the third lead wires 21a to 21c cooperate to form the main bodies 19a of the second bus bars 19. Therefore, the first to the third lead wires 21a to 21c, which serves as the buffer portions, are easily provided in the main bodies 19a of the second bus bars 19. The functions and effects of the first embodiment are also applicable to the fourth embodiment.

Fifth Embodiment

Figure 9:
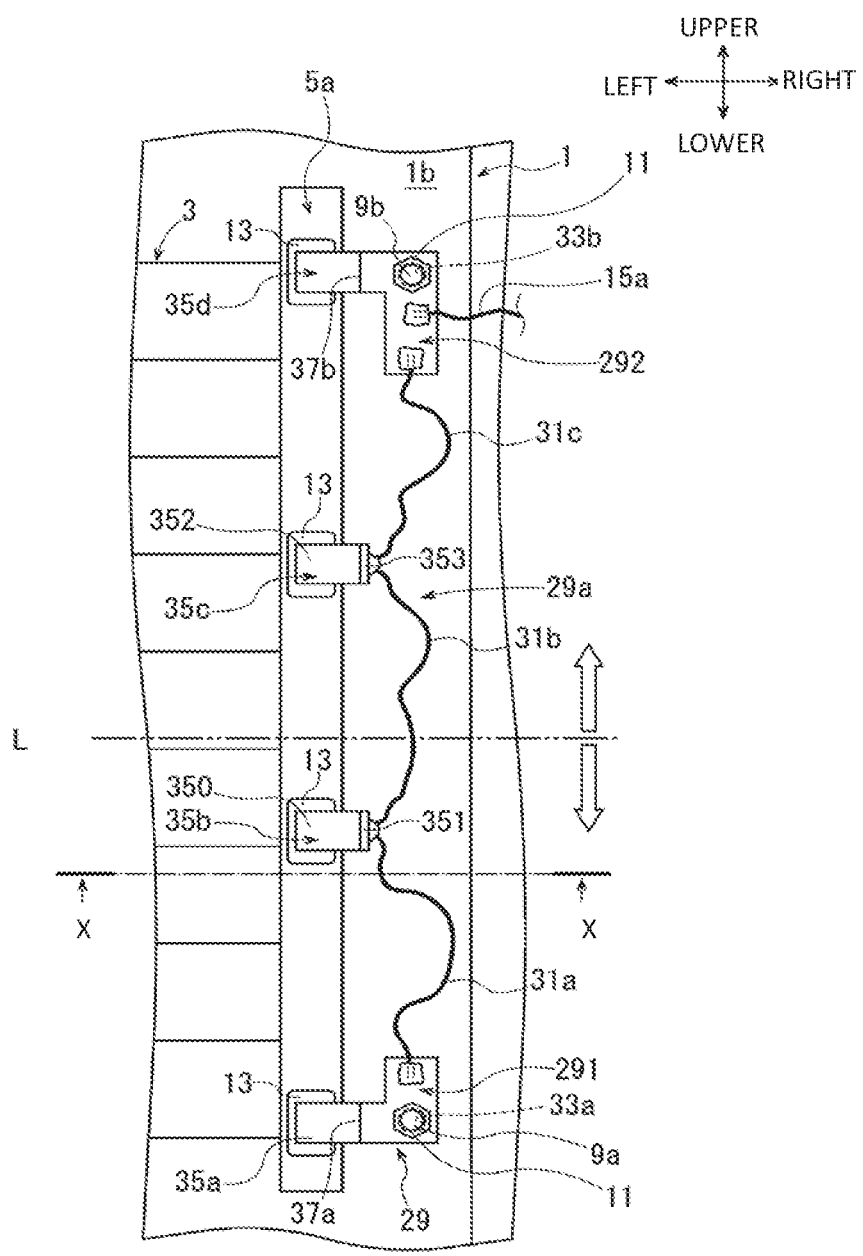
FIG. 9 is also a view similar to FIG. 2, but showing a plastic window according to a fifth embodiment of the present invention.

The following will describe a plastic window according to a fifth embodiment of the present invention with reference to FIGS. 9 and 10. In the fifth embodiment, the second bus bars 7a, 7b are substituted by a matched pair of second bus bars 29 (only one second bus bar 29 is shown in FIG. 9). Like the second bus bars 7a, 7b, the second bus bars 29 are symmetrical to each other and respectively arranged on the right and the left parts of the second surface 1*b* of the window body 1. The following description will focus on the second bus bar 29 arranged on the right part of the second surface 1*b* of the window body 1.

The second bus bar 29 includes a plurality of connection pieces, namely the first and the second connection pieces 291 and 292, and a plurality of lead wires, namely the first to the third lead wires 31*a* to 31*c*, which serve as the buffer portions. Wiring with the first to the third lead wires 31*a* to 31*c* is an example of wiring according to the present invention. The first connection piece 291, the second connection piece 292, and the first to the third lead wires 31*a* to 31*c* cooperate to form a main body 29*a* of the second bus bar 29. The second bus bar 29 further has first fixing portions 33*a* and 33*b* and second fixing portions 35*a* to 35*d*.

The first connection piece 291 and the second connection piece 292 are made of a conductive metal. The first connection piece 291 and the second connection piece 292 are disposed at the lower end and the upper end of the second bus bar 29, respectively. The first fixing portion 33*a* is formed through the first connection piece 291 at the lower end thereof and the first fixing portion 33*b* is formed through the second connection piece 292 at the upper end thereof.

The second fixing portion 35*a* is formed continuing and extending leftward from the lower end of the first connection piece 291 and hence from the main body 29*a* parallel to the second surface 1*b* of the window body 1. Additionally, a first stepped portion 37*a* is formed between the first connection piece 291 and the second fixing portion 35*a* as well as the first stepped portion 77*a*. The same is true of the second fixing portion 35*d*.

The second fixing portions 35*b*, 35*c* are made of a metal strip and provided slightly leftward from the first connection piece 291 and the second connection piece 292. As shown in FIG. 10, the second fixing portion 35*b* has an L-shape including a flat portion 350 extending parallel to the second surface 1*b* of the window body 1 and a wall portion 351 formed continuing to and extending from the flat portion 350 at a right angle. The same is true of the second fixing portion 35*c* shown in FIG. 9.

Additionally, the upper and lower ends of the first lead wire 31*a* are respectively soldered to the wall portion 351 of the second fixing portion 35*b* and the upper end of the first connection piece 291. In other words, the first connection piece 291 and the second fixing portion 35*b* are connected through the first lead wire 31*a*. The upper and lower ends of the second lead wire 31*b* are respectively soldered to the wall portion 353 of the second fixing portion 35*c* and the wall portion 351 of the second fixing portion 35*b*. In other words, the second fixing portions 35*b*, 35*c* are connected through the second lead wire 31*b*. The upper and lower ends of the third lead wire 31*c* are respectively soldered to the lower end of the second connection piece 292 and the wall portion 353 of the second fixing portion 35*c*. In other words, the second fixing portion 35*c* and the second connection piece 292 are connected through the third lead wire 31*c*. Therefore, the first connection piece 291, the second connection piece 292, and the second fixing portions 35*b*, 35*c* are electrically connected through the first lead wire 31*a* between the first connection piece 291 and the second fixing portion 35*b*, the second lead wire 31*b* between the second fixing portion 35*b* and the second fixing portion 35*c*, and the third lead wire 31*c* between the second fixing portion 35*c* and the second connection piece 292.

The first to the third lead wires 31*a* to 31*c* are longer than the respective distances between the first connection piece 291 and the second fixing portion 35*b*, between the second fixing portion 35*b* and the second fixing portion 35*c*, and between the second fixing portion 35*c* and the second connection piece 292. The first to the third lead wires 31*a* to 31*c* may be connected to the first connection piece 291 the second connection piece 292, and the second fixing portions 35*b*, 35*c* by any other means than soldering.

The second bus bar 29 is fixed to the first bus bar 5*a* and to the second surface 1*b* of the window body 1. Specifically, the second fixing portions 35*a*, 35*b* are arranged below the reference line L and the second fixing portions 35*c*, 35*d* above the reference line L. The second fixing portions 35*a*, 35*d*, the flat portion 350 of the second fixing portion 35*b*, and the flat portion 352 of the second fixing portion 35*c* are respectively soldered to the first bus bar 5*a*. Therefore, the second bus bar 29 is electrically connected to the first bus bar 5*a* through the soldered portions 13.

The first connection piece 291 is fixed to the second surface 1*b* of the window body 1 by the first shank 9*a* inserted through the first fixing portion 33*a* and the nut 11. This configuration is true of the second connection piece 292, so that the main body 29*a* of the second bus bar 29 is fixed to the second surface 1*b* on the right side of the first bus bar 5*a*. Additionally, the lead wire 15*a* is soldered to the second connection piece 292. The left second bus bar 29 (not shown in the drawing) is fixed to the first bus bar 5*b* and the second surface 1*b* in the same manner as the right second bus bar 29. The rest of the configuration of this plastic window is same as the first embodiment of the present invention.

As is the case with the third embodiment, the first to the third lead wires 31*a* to 31*c* absorb the difference in expansion and contraction between the window body 1 and each second bus bar 29 by the slack of the lead wires, so that the second fixing portions 35*a* to 35*d* are not likely to fall off the first bus bars 5*a*, 5*b*.

In this plastic window of the fifth embodiment, the first and the second connection pieces 291, 292 and the first to the third lead wires 31*a* to 31*c* cooperate to form the main bodies 29*a* of the second bus bars 29. Therefore, the first to the third lead wires 31*a* to 31*c*, which serve as the buffer portions, are easily provided in the main bodies 29*a* of the second bus bars 29. In this plastic window in which only the first and the second connection pieces 291, 292 are fixed to the second surface of the window body 1, the second bus bars 29 have a simpler configuration than the second bus bars 19. The functions and effects of the first embodiment are also applicable to the fifth embodiment.

Although the specific five embodiments have been described as above, the present invention is not limited thereto, and the invention may appropriately be modified within the gist of the present invention.

For example, the second fixing portions 75*a*, 75*b* of the second bus bars 7*a*, 7*b* are soldered to the first bus bars 5*a*, 5*b* below and above the reference line L, respectively, so that the main bodies 71 of the second bus bars 7*a*, 7*b* are fixed to the second surface 1*b* of the window body 1 across the reference line L. According to the present invention, however, the second fixing portions 75*a*, 75*b* need not necessarily be separately arranged above and below the reference line L, and the main bodies 71 need not necessarily be arranged across the reference line L. The same is true of the second bus bars 19 and 29.

Additionally, in the second bus bars 7*a*, 7*b*, a plurality of shanks may be formed extending from the main bodies 71 of the second bus bars 7*a*, 7*b* toward the second surface 1*b* of the window body 1 so as to serve as first fixing portions, and may be fit in the second surface 1b to fix the main bodies 71. The same is true of the second bus bars 19 and 29.

The second bus bars 7a, 7b may have a first fixing portion and a second fixing portion other than the first fixing portions 73a, 73b and the second fixing portions 75a, 75b. The same is true of the second bus bars 19 and 29.

The second bus bar 19 needs not necessarily have the second connection piece 192 and the second lead wire 21b. The second bus bar 29 needs not necessarily have the second fixing portion 35b and the second lead wire 31b as well.

The plastic window according to the third to the fifth embodiments of the present invention may have the cover 17.

In the plastic windows according to the aforementioned five embodiments of the present invention, the window body 1 may be curved.

In the plastic windows according to the aforementioned five embodiments of the present invention, the conductive portion 3 may electrically light up.

In the plastic window according to the first embodiment of the present invention, the second fixing portions 75a, 75b need not necessarily be parallel to the second surface 1b of the window body 1 as long as the second fixing portions 75a, 75b extend along the second surface 1b. The same is true of the plastic windows according to the second to the fifth embodiments of the present invention.

The present invention is applicable to vehicles and buildings.

What is claimed is:

1. A plastic window comprising:
   a plastic window body formed in a plate shape and having a first surface and a second surface on opposing sides of the window body;
   a conductive portion made of a conductive material and disposed on the second surface of the window body;
   a first bus bar made of a conductive material and disposed on the second surface of the window body to be electrically connected to the conductive portion; and
   a second bus bar electrically connected to the first bus bar, wherein the second bus bar has a main body that is electrically connected to a controller, a plurality of first fixing portions, and a plurality of second fixing portions made of a conductive metal strip,
   the first fixing portions fix the main body to the second surface at positions offset in a left-right direction from the first bus bar when viewed from a direction perpendicular to the second surface,
   the second fixing portions extend from the main body in the left-right direction away from the first fixing portions along the second surface and are attached to the first bus bar for electrical connection to the first bus bar, and
   the plurality of first fixing portions extend farther away from the second surface than do the plurality of second fixing portions.

2. The plastic window according to claim 1, wherein the main body includes a conductive buffer portion to absorb a difference in expansion and contraction between the window body and the second bus bar due to a change of temperature.

3. The plastic window according to claim 2, wherein the main body includes a plurality of electrical connection pieces, and the buffer portion is formed by a lead wire that connects between the electrical connection pieces.

4. The plastic window according to claim 2, wherein the buffer portion is formed by a lead wire that connects between the second fixing portions.

5. The plastic window according claim 1, wherein the second fixing portions extend in the left-right direction toward the first bus bar.

6. The plastic window according to claim 1, wherein the second fixing portions of the second bus bar are fixed to the first bus bar both below and above a reference line located at a center of the window body and extending in the left-right direction.

7. The plastic window according claim 1, wherein
   the second bus bar further comprises a stepped portion that extends in an interior-exterior direction and positions the second fixing portions closer to the second surface of the window body than the main body.

8. The plastic window according claim 1, further comprising
   a third bus bar and a fourth bus bar disposed on an opposite side of the plastic window in the left-right direction from the first bus bar and the second bus bar, wherein
   the first bus bar and the third bus bar are symmetrical to each other; and
   the second bus bar and the fourth bus bar are symmetrical to each other.

9. The plastic window according claim 1, further comprising:
   a plurality of shanks extending away from the second surface of the plastic window through the plurality of first fixing portions; and
   a plurality of nuts connected to the plurality of shanks configured to secure the second bus bar to the second surface of the plastic window.

* * * * *